United States Patent
Xiao

(10) Patent No.: US 10,571,739 B2
(45) Date of Patent: Feb. 25, 2020

(54) LIQUID CRYSTAL DISPLAY DEVICE AND METHOD FOR MANUFACTURING THE SAME

(71) Applicants: Boe Technology Group Co., Ltd., Beijing (CN); Beijing Boe Multimedia Technology Co., Ltd., Beijing (CN)

(72) Inventor: Xiangchun Xiao, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 126 days.

(21) Appl. No.: 15/563,217

(22) PCT Filed: Apr. 13, 2017

(86) PCT No.: PCT/CN2017/080348
§ 371 (c)(1),
(2) Date: Sep. 29, 2017

(87) PCT Pub. No.: WO2018/072409
PCT Pub. Date: Apr. 26, 2018

(65) Prior Publication Data
US 2018/0348572 A1 Dec. 6, 2018

(30) Foreign Application Priority Data
Oct. 19, 2016 (CN) .......................... 2016 1 0909356

(51) Int. Cl.
*G02F 1/1335* (2006.01)
*F21V 8/00* (2006.01)
*G02F 1/1362* (2006.01)

(52) U.S. Cl.
CPC ..... *G02F 1/133553* (2013.01); *G02B 6/0055* (2013.01); *G02F 1/133512* (2013.01);
(Continued)

(58) Field of Classification Search
CPC ............... G02F 1/133553; G02F 2001/133567
See application file for complete search history.

(56) References Cited

U.S. PATENT DOCUMENTS

2001/0017679 A1* 8/2001 Ha ..................... G02F 1/133555
349/113
2003/0071945 A1 4/2003 Kim
(Continued)

FOREIGN PATENT DOCUMENTS

| CN | 101393344 A | 3/2009 |
| CN | 201732228 U | 2/2011 |

(Continued)

OTHER PUBLICATIONS

Office Action in Chinese Application No. 201610909356.6 dated Apr. 26, 2017, with English translation.
(Continued)

*Primary Examiner* — Alexander P Gross
(74) *Attorney, Agent, or Firm* — Womble Bond Dickinson (US) LLP

(57) ABSTRACT

A LCD display device and a method for manufacturing the same are disclosed. The LCD display device comprises an array substrate and an aligning substrate that are oppositely arranged, wherein the array substrate comprises a gate line and a data line that are arranged in a crossed manner; and a liquid crystal layer disposed between the array substrate and the aligning substrate. On the side of the array substrate away from the liquid crystal layer, there are provided successively a second polarizer, a light guide plate and a backlight source. A first polarizer is disposed on the side of the aligning substrate away from the liquid crystal layer. Further, the LCD display device also comprises a reflective grid disposed between the array substrate and the light guide plate, wherein the reflective grid is arranged in a shape and
(Continued)

position corresponding to at least one of the gate line and data line.

17 Claims, 3 Drawing Sheets

(52) U.S. Cl.
CPC .. *G02F 1/133528* (2013.01); *G02F 1/136286* (2013.01); *G02F 2001/133567* (2013.01)

(56) References Cited

U.S. PATENT DOCUMENTS

| | | | | |
|---|---|---|---|---|
| 2010/0033557 | A1* | 2/2010 | Abe | G02B 27/26 348/58 |
| 2010/0045620 | A1* | 2/2010 | Long | G06F 3/0412 345/173 |
| 2010/0315832 | A1* | 12/2010 | Pijlman | G02B 6/005 362/607 |
| 2011/0149218 | A1* | 6/2011 | Nakayama | B32B 37/02 349/106 |
| 2014/0192515 | A1* | 7/2014 | Kim | G02F 1/133512 362/97.1 |

FOREIGN PATENT DOCUMENTS

| | | | | |
|---|---|---|---|---|
| CN | 103094205 A | 5/2013 | | |
| CN | 103676316 A | 3/2014 | | |
| CN | 105425454 A | 3/2016 | | |
| CN | 106292050 A | 1/2017 | | |
| CN | 206096713 U | 4/2017 | | |
| KR | 20110073725 | * | 6/2011 | ....... G02F 1/133504 |
| KR | 20110073725 A | 6/2011 | | |

OTHER PUBLICATIONS

Office Action in Chinese Application No. 201610909356.6 dated Aug. 7, 2017, with English translation.
Search Report in Chinese Application No. 201610909356.6 dated Feb. 16, 2017, with English translation.
Decision on Rejection in Chinese Application No. 201610909356.6 dated Oct. 26, 2017, with English translation.
International Search Report and Written Opinion in PCT/CN2017/080348 dated Jul. 18, 2017, with English translation.

* cited by examiner

LIQUID CRYSTAL DISPLAY DEVICE AND METHOD FOR MANUFACTURING THE SAME

RELATED APPLICATIONS

The present application is the U.S. national phase entry of PCT/CN2017/080348 with an International filing date of Apr. 13, 2017, which claims the benefit of Chinese Patent Application No. 201610909356.6, filed on Oct. 19, 2016, the entire disclosure of which is incorporated herein by reference.

TECHNICAL FIELD

The present disclosure relates to the field of liquid crystal display technology, and more particular to a liquid crystal display device and a method for manufacturing the same.

BACKGROUND ART

An existing backlight system used for a liquid crystal display device mainly comprises a reflective film, a light guide plate and an optical film, none of which, however, conduct individual optical processing on a single pixel unit. That is to say, light emitted from a backlight source will generally be incident entirely on a liquid crystal display panel, i.e., the backlight may be partially incident on a data line or gate line of an array substrate and thus wasted. The shading of the partial backlight by the data line or gate line on the array substrate will give rise to backlight losses and lower its utilization rate.

Generally speaking, in the art, in order to improve the utilization rate of backlight and the light transmittance of a liquid crystal display device, it is often required to increase the aperture ratio of a liquid crystal pixel window. However, such an increase in the aperture ratio tends to cause other multiple problems easily, such as increased processing steps, increased process difficulty and increased manufacturing costs, which are disadvantageous in the actual production.

SUMMARY

The embodiments of the present disclosure provide a liquid crystal display device and a method for manufacturing the same, so as to at least partially eliminate or alleviate one or more of the plurality of technical problems as mentioned above.

According to a first aspect of the present disclosure, there is provided a liquid crystal display device. The liquid crystal display device comprises an array substrate and an aligning substrate that are oppositely arranged, wherein the array substrate comprises a gate line and a data line that are arranged in a crossed manner; a liquid crystal layer disposed between the array substrate and the aligning substrate; a light guide plate disposed on the side of the array substrate away from the liquid crystal layer; a backlight source for providing a light incident on the light guide plate; a first polarizer disposed on the side of the aligning substrate away from the liquid crystal layer; and a second polarizer disposed between the array substrate and the light guide plate. Further, the liquid crystal display device also comprises a reflective grid disposed between the array substrate and the light guide plate, wherein the reflective grid is arranged in a shape and position corresponding to at least one of the gate line and data line on the array substrate.

In the liquid crystal display device according to this aspect of the present disclosure, the reflective grid is formed on the light incident side of the liquid crystal display panel, namely between the array substrate and the light guide plate. Besides, such a reflective grid corresponds to the gate line or data line on the array substrate in terms of shape and position, in such a way that the backlight that could otherwise have been incident on the gate line or data line of the array substrate will be reflected by the reflective grid provided according to this aspect of the present disclosure, and then can return to the display panel through further reflection by the light guide plate. Thus, the display device according to this aspect of the present disclosure not only enhances the utilization rate of backlight, but also reduces the requirement for the aperture ratio of the display pixel. As an example, the material for making the reflective grid as mentioned above may comprise silver and the like, and may have a thickness of e.g. 100 nm. Of course, the present disclosure is not limited to such an exemplary material, and those skilled in the art can readily obtain the appropriate material composition for the reflective grid and further the thickness setting according to specific practical demands.

According to a specific embodiment, in the liquid crystal display device as mentioned above, the reflective grid is arranged on the side of the array substrate facing the light guide plate. Alternatively, according to another specific embodiment, the reflective grid is arranged on the side of the second polarizer facing the light guide plate. According to the specific implementation of the present disclosure, the reflective grid is mainly used to reflect the light that could otherwise have been incident on the gate line or data line, thereby re-utilizing the light that may be wasted. It can thus be seen that such a reflective grid can be disposed either on the light incident side of the array substrate or on the light incident side of the second polarizer. Of course, the present disclosure is not limited in terms of the position setting of the reflective grid as long as the corresponding light reflective function thereof can be realized. Further alternatively, according to a specific embodiment, the reflective grid is fixedly arranged with respect to at least one of the gate line and the data line on the array substrate. Such a relative positional relationship ensures that the reflective grid and the pixel unit are fixedly arranged. Thus, even if the liquid crystal display panel expands or shrinks during operation, the reflective grid will change accordingly so as to guarantee the effect of reflecting the light that could otherwise have been incident on the data line and the gate line.

According to a specific embodiment, in the liquid crystal display device as mentioned above, the reflective grid further comprises a single protective layer. Such a single protective layer is arranged on the side of the reflective grid facing the light guide plate or on the side of the reflective grid away from the light guide plate. Alternatively, according to another specific embodiment, the reflective grid further comprises two protective layers. The two protective layers are respectively arranged on the side of the reflective grid facing the light guide plate and on the side of the reflective grid away from the light guide plate. Under the circumstances where a protective layer is provided, such a protective layer can effectively protect the reflective grid from damage, such as wear or breakage, during subsequent processing and operation. Of course, as can be readily understood by those skilled in the art, such a protective layer can be provided on one side of the reflective grid or on both sides of the reflective grid simultaneously. In addition, the material and thickness of the protective layer can be selected according to specific practices. Of course, the present disclosure is not limited thereto.

According to a specific embodiment, in the liquid crystal display device as mentioned above, the light guide plate further comprises a reflective film disposed on the side of the light guide plate facing the array substrate. Alternatively, according to another specific embodiment, the light guide plate further comprises an optical compensation film on the side of the light guide plate facing the array substrate. The reflective film additionally provided for the light guide plate facilitates further reflection of the light reflected by the reflective grid, which is helpful for the improvement on repeated utilization of backlight. Moreover, different types of optical compensation films, such as phase compensation or color difference compensation, can greatly improve the quality of backlight emission and therefore guarantee excellent display performance of the liquid crystal display device.

According to another aspect of the present disclosure, there is also provided a method for manufacturing a liquid crystal display device, which comprises the steps of: providing an array substrate and an aligning substrate that are oppositely arranged, wherein the array substrate comprises a gate line and a data line that are arranged in a crossed manner; forming a liquid crystal layer between the array substrate and the aligning substrate; forming a light guide plate on the side of the array substrate away from the liquid crystal layer; providing a backlight source configured to provide a light incident on the light guide plate; forming a first polarizer on the side of the aligning substrate away from the liquid crystal layer; and forming a second polarizer between the array substrate and the light guide plate. Further, the method for manufacturing also comprises the step of forming a reflective grid between the array substrate and the light guide plate, wherein the reflective grid is arranged in a shape and position corresponding to at least one of the gate line and data line on the array substrate.

Similar to the depiction of the liquid crystal display device according to the first aspect, in the method for manufacturing a liquid crystal display device according to this aspect of the present disclosure, the backlight that could otherwise have been incident on the gate line or data line can be reflected by the reflective grid that is separately formed, and be further reflected additionally by the light guide plate back to the liquid crystal panel. Thus, it not only enhances the utilization rate of backlight, but also reduces the requirement for the aperture ratio of the display pixel.

According to a specific embodiment, in the method for manufacturing a liquid crystal display device as mentioned above, the step of forming a reflective grid comprises: forming the reflective grid on the side of the array substrate facing the light guide plate. Further, according to another specific embodiment, the step of forming a reflective grid comprises: forming the reflective grid on the side of the second polarizer facing the light guide plate. Similarly, those skilled in the art shall readily understand that the position of the reflective grid is not limited to the above two circumstances listed as examples. In fact, the reflective grid can be arranged at any suitable position as long as it is adapted to reflect the light that could otherwise have been incident on the data line or gate line for re-utilization.

As a specific example, in the method for manufacturing a liquid crystal display device as mentioned above, the step of forming a reflective grid comprises: forming a reflective layer on the side of the second polarizer facing the light guide plate; and patterning the reflective layer to form a reflective grid. In brief, in such a forming process, the reflective grid is formed by the two steps: layer formation and subsequent patterning. To be specific, in the above manufacturing process, the reflective layer is formed by coating, vapor deposition or printing. Further, still in the above manufacturing process, patterning comprises photoetching. Exemplarily, such photoetching comprises self-aligned photoetching. As a specific example, in the method for manufacturing a liquid crystal display device as mentioned above, the reflective grid is formed by high-precision printing on the side of the second polarizer facing the light guide plate. Of course, as can be readily understood by those skilled in the art, in regard to the formation of the reflective layer and the subsequent patterning, any suitable process technology, such as deposition, coating and photoetching, may be used in principle, and the present disclosure is not limited thereto in this aspect.

According to a specific embodiment, the method for manufacturing a liquid crystal display device as mentioned above further comprises: forming a protective layer on the side of the second polarizer facing the light guide plate before forming the reflective layer. Alternatively, in another specific embodiment, the method for manufacturing a liquid crystal display device as mentioned above further comprises: forming a protective layer covering the reflective grid after forming the reflective grid. With reference to the specific depiction about the liquid crystal display device, the provision of such a protective layer is helpful for enhanced protection of the reflective grid, which further ensures the operational performance and corresponding display quality of the liquid crystal display device.

According to a specific embodiment, in the method for manufacturing a liquid crystal display device as mentioned above, the step of forming a second polarizer comprises: providing a second polarizer with a reflective layer on one side, wherein the reflective layer faces the light guide plate; and the step of forming a reflective grid comprises: photoetching the reflective layer on the second polarizer to form a reflective grid. In such a specific implementation, a reflective layer used for forming a reflective grid is originally provided together with the second polarizer, and then the reflective layer is patterned to finally form a reflective grid.

According to another specific embodiment, in the method for manufacturing a liquid crystal display device as mentioned above, the step of forming a reflective grid comprises: forming a reflective grid on a side of a transparent layer; and attaching the transparent layer having the reflective grid entirely to the side of the second polarizer facing the light guide plate by means of a high-precision aligned attachment technique. In such an implementation, the reflective grid is first formed on another transparent layer (namely, another medium) and then entirely attached to the second polarizer. According to such a manufacturing process, attachment of the reflective grid to the second polarizer by means of another auxiliary medium reduces the operational difficulty and facilitates improvement in processing speed.

DETAILED DESCRIPTION

Figure 1:
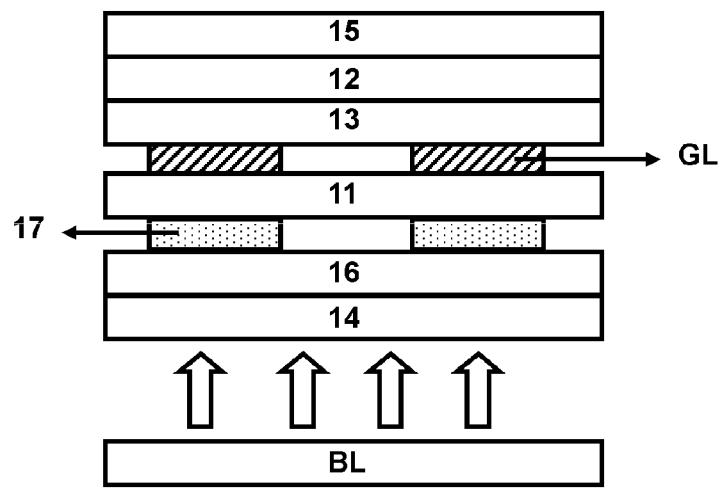
FIG. 1 schematically illustrates a cross-sectional view of a liquid crystal display device according to an embodiment of the present disclosure.

A liquid crystal display device and a method for manufacturing the same according to an embodiment of the present disclosure will be described in detail with reference to the drawings. It shall be pointed out that the drawings may not necessarily be drawn in scale. In contrast, emphasis shall generally be placed on the explanation of the principle of the present disclosure. Hence, the size, position, etc. of various elements, films, layers, etc. shown in the drawings do not represent the authentic size, position, etc., and are aimed only to facilitate understanding of the implementation and principle of the present disclosure.

With reference to FIG. 1, it schematically illustrates a cross-sectional view of a liquid crystal display device according to an embodiment of the present disclosure. The liquid crystal display device 10 may comprise an array substrate 11 and an aligning substrate 12 that are oppositely arranged, a liquid crystal layer 13 disposed between the array substrate 11 and the aligning substrate 12; a light guide plate 14 disposed on the side of the array substrate 11 away from the liquid crystal layer 13; a backlight source BL for providing a light incident on the light guide plate 14; a first polarizer 15 disposed on the side of the aligning substrate 12 away from the liquid crystal layer 13; and a second polarizer 16 disposed between the array substrate 11 and the light guide plate 14. In addition, the array substrate 11 may specifically comprise a gate line GL and a data line (not shown in FIG. 1) that are arranged in a crossed manner. The gate line GL is schematically shown in FIG. 1 by a slash shadow, and as can be readily understood by those skilled in the art, the data line and the gate line GL can be arranged in a crossed manner on the array substrate 11 in a similar manner, with further reference to FIG. 2.

It shall be pointed out that although the backlight source BL is schematically shown under the light guide plate 14 in FIG. 1, it shall be understood as exemplary and not a limitation to the present disclosure. Apparently, those skilled in the art can flexibly arrange the backlight source BL to any other suitable place according to specific demands. For example, for a side-emitting backlight module, the backlight source BL can be arranged at the end of the light guide plate 14 and provide an incident light laterally to the light guide plate 14.

Further, the liquid crystal display device 10 may also comprise a reflective grid 17 disposed between the array substrate 11 and the light guide plate 14, wherein the reflective grid 17 is arranged in a shape and position corresponding to at least one of the gate line GL and data line on the array substrate 11. In FIG. 1, exemplarily, the reflective grid 17 is arranged on the side of the array substrate 11 facing the light guide plate 14, and corresponds to the gate line GL on the array substrate 11 in terms of shape and position. Of course, the present disclosure is not limited thereto, with further reference to FIG. 2.

In the liquid crystal display device 10 shown in FIG. 1, the reflective grid 17 is formed on the light incident side of the liquid crystal display device 10, namely on the side of the array substrate 11 facing the light guide plate 14. Besides, such a reflective grid 17 corresponds to the gate line GL on the array substrate 11 in terms of shape and position, in such a way that the backlight that could otherwise have been incident on the gate line GL of the array substrate 11 will be reflected by the reflective grid 17 provided in FIG. 1, and then can return to the liquid crystal layer 13 through further reflection by the light guide plate 14. Thus, such a liquid crystal display device not only enhances the utilization rate of backlight, but also reduces the requirement for the aperture ratio of the display pixel. As can be readily understood by those skilled in the art, the material for making the reflective grid as mentioned above may be any suitable metal material, such as silver. Additionally, for the thickness setting of the reflective grid, those skilled in the art can make a best choice according to specific practice and test results. As an example, for a silver reflective grid, the thickness thereof may be selected as 100 nm. Of course, the present disclosure is not limited thereto.

Figure 2:
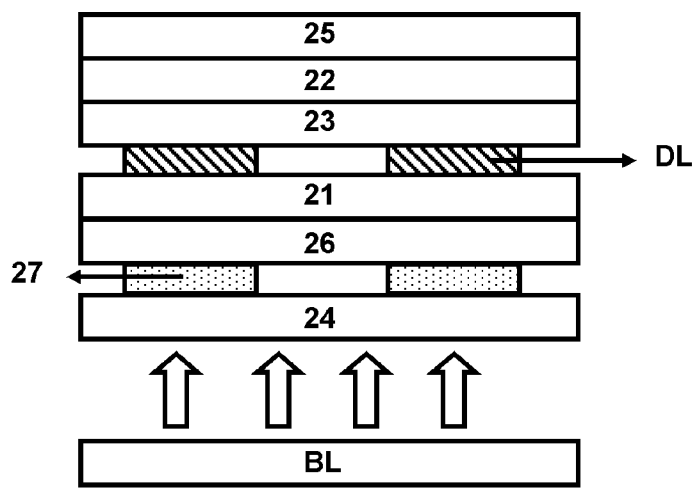
FIG. 2 schematically illustrates a cross-sectional view of another liquid crystal display device according to an embodiment of the present disclosure.

With reference to FIG. 2, it illustrates the cross-sectional view of another liquid crystal display device according to another specific embodiment of the present disclosure. It shall be pointed out herein that the configuration of the liquid crystal display device 20 shown in FIG. 2 is substantially the same as that of the liquid crystal display device 10 shown in FIG. 1, and the reference numerals 21, 22, 23, 24, 25, 26 and 27 indicate the components identical with the array substrate 11, the aligning substrate 12, the liquid crystal layer 13, the light guide plate 14, the first polarizer 15, the second polarizer 16 and the reflective grid 17 in FIG. 1. Hence, repeated description about these identical components is omitted herein. The main difference between the liquid crystal display device 20 in FIG. 2 and the liquid crystal display device 10 in FIG. 1 lies in that in FIG. 2, the reflective grid 17 is arranged on the side of the second polarizer 26 facing the light guide plate 24, and the reflective grid 17 corresponds to the data line DL in terms of shape and position. Under the teaching of the present disclosure, those skilled in the art can readily envisage that the position setting of the reflective grid is not limited to the circumstances shown in FIGS. 1 and 2 and is allowable as long as the following function can be realized: the light that could otherwise have been incident on the gate line or date line is reflected so that the light which may be wasted can be re-utilized.

According to a further specific embodiment, the reflective grid 17, 27 is fixedly arranged with respect to at least one of the gate line GL and the data line DL on the array substrate 11, 21. Such fixing arrangement of the relative positional relationship ensures that the reflective grid is stationary with respect to the pixel unit. In doing so, even if the liquid crystal display panel expands or shrinks during operation, the reflective grid will change accordingly so as to guarantee good reflection of the light that could otherwise have been incident on the data line or the gate line.

Figure 3:
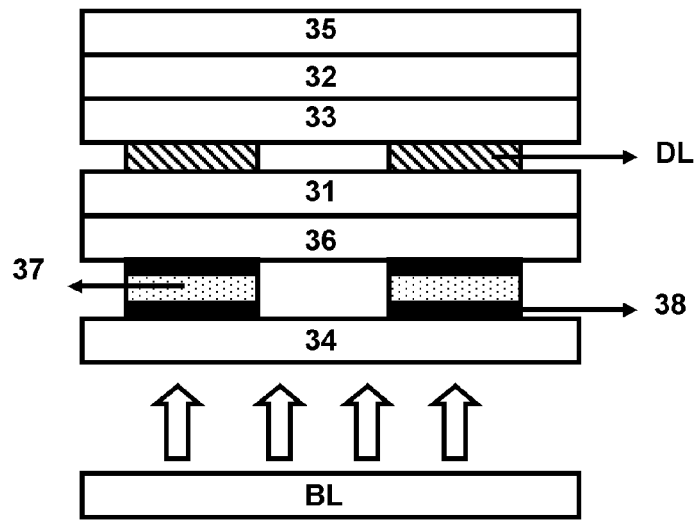
FIG. 3 schematically illustrates a cross-sectional view of a further liquid crystal display device according to an embodiment of the present disclosure.

Further, with reference to FIG. 3, it illustrates the schematic cross-sectional view of a further liquid crystal display device according to an embodiment of the present disclosure. It shall be pointed out herein that the configuration of the liquid crystal display device 30 shown in FIG. 3 is substantially the same as that of the liquid crystal display device 20 shown in FIG. 2, and the reference numerals 31, 32, 33, 34, 35 and 36 indicate the components identical with the array substrate 21, the aligning substrate 22, the liquid crystal layer 23, the light guide plate 24, the first polarizer 25 and the second polarizer 26 in FIG. 2. Hence, repeated description about these identical components is omitted herein. The main difference between the liquid crystal display device 30 in FIG. 3 and the liquid crystal display device 20 in FIG. 2 lies in that in FIG. 3, according to a specific embodiment, the reflective grid 37 may further comprise a protective layer 38, which is indicated in a solid pattern in FIG. 3. It shall be noted that although the protective layer 38 in FIG. 3 is shown to be formed on the upper and lower sides of the reflective grid, namely on the side thereof facing the light guide plate 34 and the side thereof away from the light guide plate 34, the protective layer 38 may also be individually formed on any one side. That is to say, the protective layer 38 can be formed on the side of the reflective grid 37 facing the light guide plate 34 or on the side of the reflective grid 37 away from the light guide plate 34. The present disclosure is not limited thereto in this aspect. Such a protective layer 38 can effectively protect the reflective grid 37 from damage, such as wear or breakage, during subsequent processing and operation. Of course, as for the material and thickness of the protective layer, those skilled in the art can make a selection according to specific practices under the teaching of the present disclosure.

Figure 4:
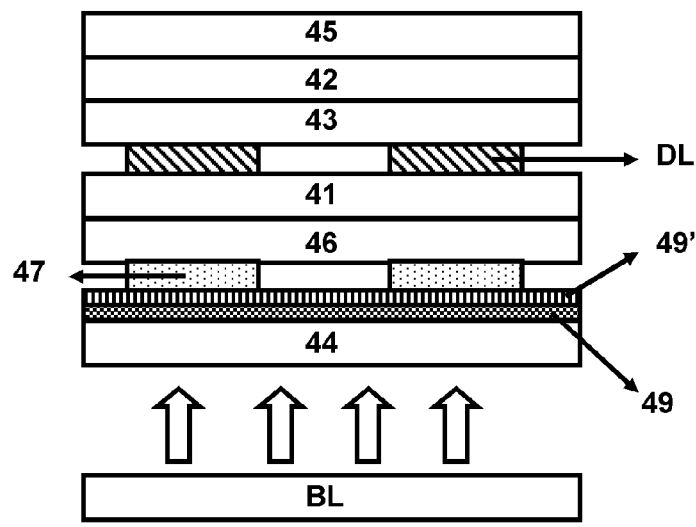
FIG. 4 schematically illustrates a cross-sectional view of a yet liquid crystal display device according to an embodiment of the present disclosure.

Further, with reference to FIG. 4, it illustrates the schematic cross-sectional view of a yet liquid crystal display device according to an embodiment of the present disclosure. It shall be pointed out herein that the configuration of the liquid crystal display device 40 shown in FIG. 4 is substantially the same as that of the liquid crystal display device 20 shown in FIG. 2, and the reference numerals 41, 42, 43, 45, 46 and 47 indicate the components identical with the array substrate 21, the aligning substrate 22, the liquid crystal layer 23, the first polarizer 25, the second polarizer 26 and the reflective grid 27 in FIG. 2. Hence, repeated description about these identical components is omitted herein. The main difference between the liquid crystal display device 40 in FIG. 4 and the liquid crystal display device 20 in FIG. 2 lies in that in FIG. 4, according to a specific embodiment, the light guide plate 44 further comprises a reflective film 49 and an optical compensation film 49' stacked on the upper side thereof (namely, on the side of the light guide plate 44 facing the array substrate 41), which are respectively indicated by a dotted shadow and a vertical-line shadow in FIG. 4. The reflective film 49 additionally provided for the light guide plate 44 facilitates further reflection of the light reflected by the reflective grid 47, which is helpful for improvement on the repeated utilization of backlight. Moreover, different types of optical compensation films 49', such as phase compensation or color difference compensation, can greatly improve the quality of backlight emission and therefore guarantee excellent display performance of the liquid crystal display device. Of course, it shall be noted that although the reflective film 49 and the optical compensation film 49' are simultaneously formed in stack on the light guide plate 44 in FIG. 4, those skilled in the art can readily understand that it is only an exemplary arrangement, and the present disclosure is not limited thereto. Alternatively, for example, a reflective film, not an optical compensation film, is arranged on the light guide plate, or an optical compensation film, not a reflective film, is arranged on the light guide plate. In addition, the reflective film and the optical compensation film can also be simultaneously arranged on the light guide plate in any other manner that is considered suitable or useful.

Figure 5:
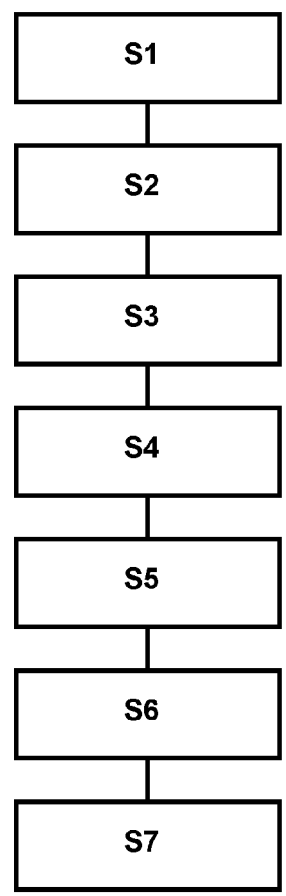
FIG. 5 schematically illustrates a flowchart of a method for manufacturing a liquid crystal display device according to an embodiment of the present disclosure.

According to another aspect, the present disclosure also provides a method for manufacturing a liquid crystal display device. Now with reference to FIG. 5, such a method for manufacturing provided by the embodiment of the present disclosure will be explained in detail, wherein FIG. 5 illustrates the flowchart of the method for manufacturing a liquid crystal display device according to an embodiment of the present disclosure. To be specific, such a method for manufacturing comprises the steps of: S1. providing an array substrate and an aligning substrate that are oppositely arranged, wherein the array substrate comprises a gate line and a data line that are arranged in a crossed manner; S2. forming a liquid crystal layer between the array substrate and the aligning substrate; S3. forming a light guide plate on the side of the array substrate away from the liquid crystal layer; S4. providing a backlight source configured to provide a light incident on the light guide plate; S5. forming a first polarizer on the side of the aligning substrate away from the liquid crystal layer; and S6. forming a second polarizer between the array substrate and the light guide plate. Further, the method for manufacturing may also comprise the step of: S7. forming a reflective grid between the array substrate and the light guide plate, wherein the reflective grid is arranged in a shape and position corresponding to at least one of the gate line and data line on the array substrate.

Similar to the depiction of the liquid crystal display devices 10, 20, 30 and 40 shown in FIGS. 1, 2, 3 and 4, in the method for manufacturing a liquid crystal display device in FIG. 5, the backlight that could otherwise have been incident on the gate line or data line can be reflected by the reflective grid that is separately formed, and be further reflected by the light guide plate back to the liquid crystal layer. In doing so, it not only enhances the utilization rate of backlight, but also reduces the requirement for the aperture ratio of the display pixel.

According to a specific embodiment, in the method for manufacturing a liquid crystal display device in FIG. 5, the step S7 of forming a reflective grid may specifically comprise: forming the reflective grid on the side of the array substrate facing the light guide plate. Alternatively, according to another specific embodiment, the step S7 of forming a reflective grid may also comprise: forming the reflective grid on the side of the second polarizer facing the light guide plate. It shall be pointed out herein that the reflective grid can be arranged at any suitable position as long as it is adapted to reflect the light that could otherwise have been incident on the data line or gate line for re-utilization.

As a specific example, in the method for manufacturing a liquid crystal display device in FIG. 5, the step S7 of forming a reflective grid may specifically comprise the following two steps: forming a reflective layer on the side of the second polarizer facing the light guide plate; and patterning the reflective layer to form a reflective grid. Exemplarily, in the above manufacturing process, the reflective layer may be formed by coating, vapor deposition or printing. Likewise, still in the above manufacturing process, patterning may comprise photoetching. Exemplarily, such photoetching comprises self-aligned photoetching. As a specific example, in the method for manufacturing a liquid crystal display device as mentioned above, the reflective grid may also be formed by high-precision printing on the side of the second polarizer facing the light guide plate. Of course, as can be readily understood by those skilled in the art, in regard to the formation of the reflective layer and the subsequent patterning, any suitable process technology, such as deposition, coating and photoetching, may be used in principle, and the present disclosure is not limited thereto in this aspect.

According to a specific embodiment, the method for manufacturing a liquid crystal display device in FIG. 5 may further comprise the step of: forming a protective layer on the side of the second polarizer facing the light guide plate before forming the reflective layer. Alternatively, in another specific embodiment, the method for manufacturing a liquid crystal display device as mentioned above may further comprise the step of: forming a protective layer covering the reflective grid after the step S7 of forming the reflective grid. It can be further understood that the provision of such a protective layer is helpful for enhanced protection of the reflective grid, which further ensures the operational performance and corresponding display quality of the liquid crystal display device.

According to a specific embodiment, in the method for manufacturing a liquid crystal display device in FIG. 5, the step S6 of forming a second polarizer comprises: providing a second polarizer with a reflective layer on one side, wherein the reflective layer faces the light guide plate. Correspondingly, the step S7 of forming a reflective grid may specifically comprise: photoetching the reflective layer on the second polarizer to form a reflective grid. In such a specific implementation, a reflective layer used for forming a reflective grid is originally provided together with the second polarizer, and then the reflective layer is patterned to finally form a reflective grid.

According to another specific embodiment, in the method for manufacturing a liquid crystal display device in FIG. 5, the step S7 of forming a reflective grid may specifically comprise: forming a reflective grid on a side of a transparent layer; and attaching the transparent layer having the reflective grid entirely to the side of the second polarizer facing the light guide plate by means of a high-precision aligned attachment technique. In such an implementation, the reflective grid is first formed on another transparent layer (namely, another medium) and then entirely attached to the second polarizer. Under such circumstances, the reflective grid is attached to the second polarizer by means of another auxiliary medium, which reduces the process difficulty and facilitates improvement in processing speed.

It shall be pointed out that in the detailed depiction of the present disclosure, the terms indicating orientation or positional relationship, such as "center", "upper", "lower", "front", "behind", "left", "right", "vertical", "horizontal", "top", "bottom", "inside" and "outside", refer to the orientation or positional relationship shown in the drawings, which is only aimed to simplify the depiction of the present disclosure, rather than imply that the device or element must have a particular orientation, or must be configured and operated in a particular orientation. Hence, all these terms and the terms having equivalent meanings shall not be understood as limitations to the present disclosure.

It shall also be pointed out that in the specific depiction of the present disclosure, the terms, such as "first" and "second", are only used for the purpose of depiction, and shall not be understood to imply the relative importance or the number of the technical features indicated thereby. Therefore, the features defined by the terms, such as "first" and "second", can explicitly or implicitly comprise one or more such features. Unless otherwise specified, "a plurality of" in the depiction of the present disclosure means two or more than two.

What needs to be further explained is that in the depiction of the present disclosure, the terms, such as "installed", "connected" and "coupled", shall be understand in their broad sense unless otherwise specified or defined. For example, it can be fixedly connected, removably connected or integrally connected. Likewise, it can be directly connected or indirectly connected by an intermedium, or even, two elements can be communicated internally. As far as those skilled in the art are involved, the specific meanings of those terms in the present disclosure can be understood according to specific conditions.

It shall also be pointed out that in the depiction of the present disclosure, specific features, structures, materials or characteristics can be combined in any one or more embodiments or examples in any suitable manner.

The above disclosed contents are only specific embodiments of the present disclosure, but the protection scope of the present disclosure is not limited thereto. Any skilled person familiar with the technologies in the art can readily think of any variation or replacement within the technical scope of the present disclosure, and these variations or replacements shall fall within the protection scope of the present disclosure. Hence, the protection scope of the present disclosure shall be based on the protection scope of the appended claims.

What is claimed is:

1. A liquid crystal display device, comprising:
   an array substrate and an aligning substrate that are oppositely arranged, wherein the array substrate comprises a gate line and a data line that are arranged in a crossed manner;
   a liquid crystal layer disposed between the array substrate and the aligning substrate;
   a light guide plate disposed on the side of the array substrate away from the liquid crystal layer;
   a backlight source for providing a light incident on the light guide plate;
   a first polarizer disposed on the side of the aligning substrate away from the liquid crystal layer; and
   a second polarizer disposed between the array substrate and the light guide plate,
   wherein the liquid crystal display device also comprises a reflective grid disposed between the array substrate and the second polarizer, and the reflective grid is arranged in a shape and position corresponding to at least one of the gate line and data line.

2. The liquid crystal display device according to claim 1, wherein the reflective grid is arranged on the side of the array substrate facing the light guide plate.

3. The liquid crystal display device according to claim 1, wherein the reflective grid is fixedly arranged with respect to at least one of the gate line and the data line.

4. The liquid crystal display device according to claim 1, wherein the reflective grid further comprises a single protective layer that is arranged on the side of the reflective grid facing the light guide plate or on the side of the reflective grid away from the light guide plate.

5. The liquid crystal display device according to claim 1, wherein the reflective grid further comprises two protective layers which are respectively arranged on the side of the reflective grid facing the light guide plate and on the side of the reflective grid away from the light guide plate.

6. The liquid crystal display device according to claim 1, wherein the light guide plate further comprises a reflective film disposed on the side of the light guide plate facing the array substrate.

7. The liquid crystal display device according to claim 1, wherein the light guide plate further comprises an optical compensation film on the side of the light guide plate facing the array substrate.

8. A method for manufacturing a liquid crystal display device, comprising the steps of:
   providing an array substrate and an aligning substrate that are oppositely arranged, wherein the array substrate comprises a gate line and a data line that are arranged in a crossed manner;

forming a liquid crystal layer between the array substrate and the aligning substrate;

forming a light guide plate on the side of the array substrate away from the liquid crystal layer;

providing a backlight source configured to provide a light incident on the light guide plate;

forming a first polarizer on the side of the aligning substrate away from the liquid crystal layer; and forming a second polarizer between the array substrate and the light guide plate, wherein the method also comprises the step of: forming a reflective grid between the array substrate and the second polarizer, wherein the reflective grid is arranged in a shape and position corresponding to at least one of the gate line and data line.

9. The method according to claim 8, wherein the reflective grid is formed between the array substrate and the second polarizer by a high-precision printing on the side of the array substrate facing the light guide plate.

10. The method according to claim 8, wherein the step of forming a reflective grid comprises: forming a reflective grid on a side of a transparent layer; and attaching the transparent layer having the reflective grid entirely to the side of the array substrate facing the light guide plate by means of a high-precision aligned attachment technique.

11. The method according to claim 8, wherein the step of forming the reflective grid between the array substrate and the second polarizer comprises:

forming the reflective grid on the side of the array substrate facing the light guide plate.

12. The method according to claim 11, wherein the step of forming the reflective grid on the side of the array substrate facing the light guide plate comprises:

forming a reflective layer on the side of the array substrate facing the light guide plate; and patterning the reflective layer to form the reflective grid.

13. The method according to claim 12, wherein the reflective layer is formed by coating, vapor deposition or printing.

14. The method according to claim 12, further comprising:

forming a protective layer on the side of the array substrate facing the light guide plate before forming the reflective layer.

15. The method according to claim 12, further comprising:

forming a protective layer covering the reflective grid after forming the reflective grid.

16. The method according to claim 12, wherein the patterning comprises photoetching.

17. The method according to claim 16, wherein the photoetching comprises self-aligned photoetching.

* * * * *